United States Patent
Pontecorvi et al.

(10) Patent No.: US 12,061,887 B2
(45) Date of Patent: Aug. 13, 2024

(54) RADIO ACCESS NETWORK APPLICATION DEPLOYMENT

(71) Applicant: Nokia Technologies Oy, Espoo (FI)

(72) Inventors: Matteo Pontecorvi, Palaiseau (FR); Luis Guilherme Uzeda Garcia, Massy (FR); Faud Mousse Abinader Junior, Massy (FR); Matteo Signorini, Palaiseau (FR)

(73) Assignee: Nokia Technologies Oy, Espoo (FI)

(*) Notice: Subject to any disclaimer, the term of this patent is extended or adjusted under 35 U.S.C. 154(b) by 427 days.

(21) Appl. No.: 17/592,094

(22) Filed: Feb. 3, 2022

(65) Prior Publication Data

US 2022/0253293 A1    Aug. 11, 2022

(30) Foreign Application Priority Data

Feb. 8, 2021   (EP) .................................. 21155746

(51) Int. Cl.
*G06F 8/60* (2018.01)

(52) U.S. Cl.
CPC ...................... *G06F 8/60* (2013.01)

(58) Field of Classification Search
CPC . G06F 8/60; G06F 8/61; H04L 9/3239; H04L 9/3247; H04L 9/50
See application file for complete search history.

(56) References Cited

U.S. PATENT DOCUMENTS

| 10,361,843 B1 | 7/2019 | Suthar et al. |
| 2020/0221299 A1 | 7/2020 | Suthar et al. |
| 2020/0329381 A1 | 10/2020 | Chou et al. |
| 2020/0351650 A1 | 11/2020 | Maria |
| 2021/0029216 A1 | 1/2021 | Stockert et al. |

FOREIGN PATENT DOCUMENTS

WO    2020/176535 A1    9/2020

OTHER PUBLICATIONS

"Security considerations of Open RAN", Ericsson, Retrieved on Jan. 12, 2021, Webpage available at : https://www.ericsson.com/en/security/security-considerations-of-openran?utm_source=linkedin&utm_medium=social_organic&utm_campaign=Networks_MANA_Radio_System-Antenna_System_20200819.
"O-RAN Architecture Description", O-RAN Alliance, O-RAN.WG1. O-RAN-Architecture-Description-v03.00, 2021, pp. 1-32.
"O-RAN Working Group 3 Near Real-time RAN Intelligent Controller E2 Service Model (E2SM)", O-Ran Alliance, ORAN-WG3. E2SM-v01.00.00, 2020, pp. 1-27.

(Continued)

*Primary Examiner* — Nader Bolourchi
(74) *Attorney, Agent, or Firm* — Nokia Technologies Oy

(57) ABSTRACT

According to an example aspect of the present invention, there is provided a method comprising: registering a record for a radio resource management application from an application vendor in a distributed ledger, wherein the record is cryptographically signed by the application vendor, comprises application data, and defines a deployment method for deploying the application to one or more radio access network controllers. The method further comprises transmitting, in accordance with the deployment method defined in the record, the application data to a radio access network controller for applying the application for radio resource management.

16 Claims, 5 Drawing Sheets

(56) References Cited

OTHER PUBLICATIONS

"O-RAN Working Group 1 Use Cases Detailed Specification", O-RAN.WG1.Use-Cases-Detailed-Specification-v04.00, 2021, pp. 1-71.
Extended European Search Report received for corresponding European Patent Application No. 21155746.7, dated May 3, 2021, 7 pages.
Notice of Allowance received for corresponding European Patent Application No. 21155746.7, dated Feb. 28, 2024, 8 pages.

RADIO ACCESS NETWORK APPLICATION DEPLOYMENT

FIELD

Various example embodiments relate to radio access network application deployment.

BACKGROUND

In mobile communication systems, entities controlling a wireless or radio access network (RAN), such as a 5G cellular RAN, comprise functionalities for managing radio resources. Some examples of such functionalities include radio transmission scheduling, radio link adaptation, and beam management.

New functions and open, interoperable interfaces are developed also for RAN entities. Open RAN may be used as a generic term for an open radio access network architecture. Open RAN may refer to overall concept of creating an open RAN environment, providing interoperability between different vendors over a set of defined interfaces. An Open RAN may have open interoperable interfaces, RAN virtualization, and support for big data and artificial intelligence AI-enabled RAN.

SUMMARY OF THE INVENTION

According to some aspects, there is provided the subject-matter of the independent claims. Some embodiments for some or all of the aspects are defined in the dependent claims.

According to a first aspect, there is provided a first method, comprising: registering a record for a radio resource management application from an application vendor in a distributed ledger, wherein the record is cryptographically signed by the application vendor, comprises application data, and defines a deployment method for deploying the application to one or more radio access network controllers, and transmitting, in accordance with the deployment method defined in the record, the application data to a radio access network controller for applying the application for radio resource management.

According to a second aspect, there is provided a second method, comprising: detecting a deployment method for a radio resource management application stored in a distributed ledger, wherein a record of the radio resource management application is stored in the distributed ledger, the record is cryptographically signed by the application vendor, comprises application data, and defines the deployment method for deploying the application to one or more radio access network controllers, and deploying, in accordance with the deployment method and based on the application data from a network node storing the distributed ledger, the radio resource management application to a radio access network controller performing radio resource management.

According to a third aspect, there is provided an apparatus, comprising means for performing the method of the first aspect, or an embodiment thereof.

According to a fourth aspect, there is provided an apparatus, comprising means for performing the method of the second aspect, or an embodiment thereof.

The means may comprise at least one processor; and at least one memory including computer program code, the at least one memory and computer program code configured to, with the at least one processor, cause the performance of the apparatus.

According to a fifth aspect, there is provided an apparatus, comprising at least one processor, at least one memory including computer program code, the at least one memory and the computer program code being configured to, with the at least one processor, cause the apparatus for performing: registering a record for a radio resource management application from an application vendor in a distributed ledger, wherein the record is cryptographically signed by the application vendor, comprises application data, and defines a deployment method for deploying the application to one or more radio access network controllers, and transmitting, in accordance with the deployment method defined in the record, the application data to a radio access network controller for applying the application for radio resource management.

According to a sixth aspect, there is provided an apparatus, comprising at least one processor, at least one memory including computer program code, the at least one memory and the computer program code being configured to, with the at least one processor, cause the apparatus for performing: detecting a deployment method for a radio resource management application stored in a distributed ledger, wherein a record of the radio resource management application is stored in the distributed ledger, the record is cryptographically signed by the application vendor, comprises application data, and defines the deployment method for deploying the application to one or more radio access network controllers, and deploying, in accordance with the deployment method and based on the application data from a network node storing the distributed ledger, the radio resource management application to a radio access network controller performing radio resource management.

According to a fifth aspect, there is provided a computer program product, a computer readable medium, or a non-transitory computer readable medium comprising program instructions for causing an apparatus to perform the method according to any one of the above aspects, or an embodiment thereof.

According to an embodiment, the detecting the deployment method comprises receiving a notification or a request from a controlling radio access network controller to obtain the radio resource management application, and the deploying the radio resource management application comprises retrieving or requesting the application data in the record of the distributed ledger in response to the received request.

According to an embodiment of any of the aspects, the radio resource management application is configured to perform machine-learning based radio resource management for at least one of: radio transmission scheduling, radio link adaptation, radio access network mobility decisions, beam management, radio access network admission control, radio access network congestion control, carrier aggregation, and dual connectivity configuration and activation management.

According to an embodiment of any of the aspects, the radio resource management application is stored in the distributed ledger as plaintext source code.

According to an embodiment of any of the aspects, the radio resource management application is stored in the distributed ledger as encrypted source code or compiled code.

According to an embodiment of any of the aspects, the record is a blockchain transaction record, and the record is registered by storing the blockchain transaction in a permissioned blockchain upon validation of the blockchain transaction by validating nodes.

EMBODIMENTS

Figure 1:
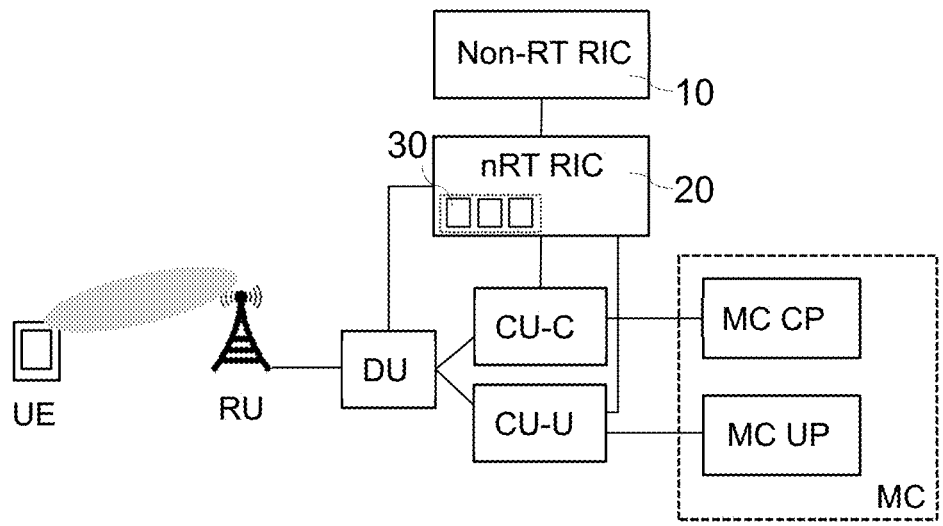
FIG. 1 illustrates an example system comprising a radio access network in accordance with some embodiments.

FIG. 1 illustrates a simplified example system in accordance with at least some embodiments. A user equipment (UE) communicates wirelessly with a radio unit (RU) of a wireless radio access network (RAN) entity or base station, such as a Node B, an evolved Node B (eNB), a Next Generation (NG) Node B (gNB), or other suitable wireless/radio access network device or system.

The UE may be referred to as a user device or a wireless terminal in general. Hence, without limiting to Third Generation Partnership Project (3GPP) User Equipment, the term user equipment or UE is to be understood broadly to cover various mobile/wireless terminal devices, mobile stations and user devices for user communication and/or machine to machine type communication. The UE may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

The UE may be attached to a cell of the base station for wireless communications. The air interface between UE and base station may be configured in accordance with a Radio Access Technology, RAT, which both the UE and RU are configured to support. Examples of cellular RATs include Long Term Evolution, LTE, New Radio, NR, which is also known as fifth generation, 5G, and MulteFire. Principles of the present disclosure are not limited to a specific RAT though.

In the context of NR, the base station may be a gNB, as in some of the example embodiments below. The base station may be connected, directly or via at least one intermediate node, with a core network (not shown), such as a Next Generation core network, Evolved Packet Core (EPC), or other network management element.

The gNB incorporates three main functional modules: a radio unit RU, a centralized unit (CU), and a distributed units (DU). The CU may further be disaggregated into CU user plane (CU-U) and CU control plane (CU-C). The CU-U and CU-C connect to DU, and to mobile core network (MC) user plane MC-UP and control plane MC-CP functions, respectively.

The RAN and the core network may comprise a set of network functions. A network function may refer to an operational and/or physical entity. The network function may be a specific network node or element, or a specific function or set of functions carried out by one or more entities, such as virtual network elements. Examples of such network functions include a radio access or resource control or management function, session management or control function, interworking, data management or storage function, authentication function or a combination of one or more of these functions.

FIG. 1 further illustrates entities of an O-RAN system. The O-RAN Alliance has four main objectives: Open Interfaces, Virtualization, Intelligence, and Interoperability. O-RAN enables service providers to deploy RUs and DUs, also referred to as O-RUs and O-DUs from different vendors with a new Lower Layer Split (LLS) split. The prefix "O-" may be applied for 3GPP defined network elements, e.g. O-CU, to indicate it adheres to the O-RAN architecture. vRAN refers to the virtualization of RAN functions, in particular higher layer and lower layer function of baseband units.

RAN Intelligent Controller (RIC) 10, 20 is a new optional element for virtualized 5G optimization technology, enabling programmability to an existing or new RAN and allowing SON-like (self-optimizing networks) capabilities to be added. The RIC adds an open application programming interface (API) into the RAN providing a non-3GPP based framework to train, deploy and run artificial intelligence (AI)/machine learning (ML)-based solutions, thus enabling RAN programmability and service optimization through embedded intelligence.

A RIC platform provides functions and interfaces for optimization through policy-driven closed loop automation, and faster, more flexible service deployments, as well as programmability with AI/ML technologies within the RAN. RIC will allow external applications (xApps) 30 to control aspects of the 5G radio network through installed control applications. xApps can come from multiple sources and provide many benefits.

The use of AI and ML at RANs has many application areas, one of them being on machine-learning-driven radio resource management (ML-Driven RRM). One example is smarter traffic steering across different layers and radio access technologies, driven by machine learning, improve spectral efficiency and network capacity. The introduction of ML-Driven RRM techniques can take place in a variety of ways. An ML-Driven RRM enabler can range from simple and incremental changes to 3GPP NR standards, such as a new UE RRM measurement object or additional RRC signalling, to more elaborate enhancements such as novel autonomous UE procedures (where the NW delegates additional responsibility to UEs) and the introduction of new functional ML training/learning hosts that reside in the core, RAN and UEs.

Figure 2:
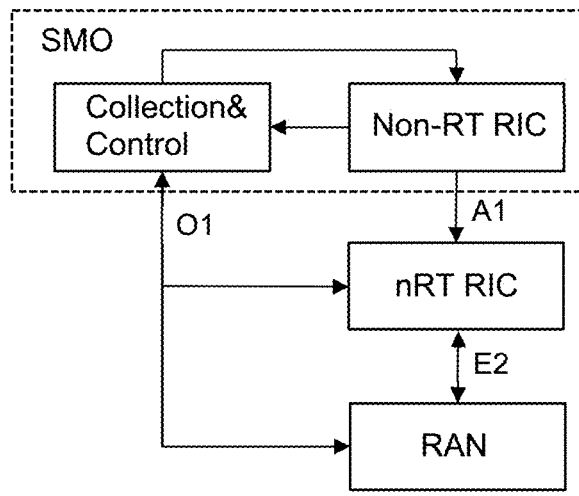
FIG. 2 illustrates O-RAN entities.

With reference also to the example of FIG. 2, non-RT RIC 10 is functionality internal to service management and orchestration (SMO) in O-RAN architecture that provides A1 interface to the Near-Real Time (Near-RT) RIC. The Non-RT RIC may support intelligent RAN optimization by providing policy-based guidance, ML model management and enrichment information to the near-RT RIC function so that the RAN can optimize, e.g., RRM under certain conditions. It can also perform intelligent radio resource management function in non-real-time interval, which may be e.g. greater than 1 second. Non-RT RIC can use data analytics and AI/ML training/inference to determine RAN optimization actions for which it can leverage SMO services such as data collection and provisioning services of the O-RAN nodes.

Near-RT RIC, or nRT RIC, 20 is a new network function placed between the RAN (which may also be referred to as E2 Node) and the management plane (referred to as SMO in O-RAN specifications) that enables near-real-time control and optimization of RAN elements and resources via finegrained data collection and actions over E2 interface. The near RT RIC may e.g. monitor, suspend/stop, override or control via policies the behavior of E2 Node (e.g. CU). The nRT RIC may host one or more xApps that use E2 interface to collect near real-time information (e.g. on a UE basis or a Cell basis) and provide value added services that should offer performance gains compared to OAM-only based methods when used to offer either near-RT RIC internal initiated optimization services and/or when working with the SMO located non-RT RIC using the A1 interface. The near-RT RIC control over the E2 Nodes is steered via the policies and the enrichment data provided via A1 from the non-RT RIC.

In traditional deployments, rolling RRM software upgrades is a rather infrequent procedure in connection with new hardware, software features or RRM features from a network infrastructure vendor. O-RAN seeks the decoupling of RAN software from the underlying hardware platform. In practice, the reference design behind the RIC system will allow 3rd-party application developers to on-board new control and optimization applications via related APIs. This means that communication service providers CSPs will be able to dynamically pick and choose targeted RRM functionality offers (xAPPs) from multiple providers instead of pseudo-monolithic solutions from a single vendor. The xApps in the nRT RIC 20 can thus be provided by different vendors. For example, one vendor can provide an xApp for RAN mobility decisions and another vendor provide the xApp for load balancing.

However, a malfunctioning xApp from a third party may cause issues on the network. Besides potential interoperability issues, the introduction of multiple 3rd-party developers may result in new threats, such malicious xApps. Because many providers can upload and propose new xApps concurrently, a root or chain of trust is important to validate and guarantee an unaltered source for the applications.

There are now provided further improvements for RRM application deployment to RANs, applying a decentralized system. The system leverages distributed ledger technology to securely deploy RRM applications for RAN entities, such as xApps 30 to 5G O-RAN RIC entities. By utilizing distributed ledger technology providing state machine replication, in some embodiments blockchain technology and ledger, non-repudiable root of trust for an RRM application in terms of its source can be established. The distributed ledger comprises one or more transaction records for deploying RRM applications. Such transaction record comprises RRM application data, which may comprise program code and metadata of the application. The transaction record defines deployment method for deploying the RRM application to one or more RAN controllers.

Figure 3:
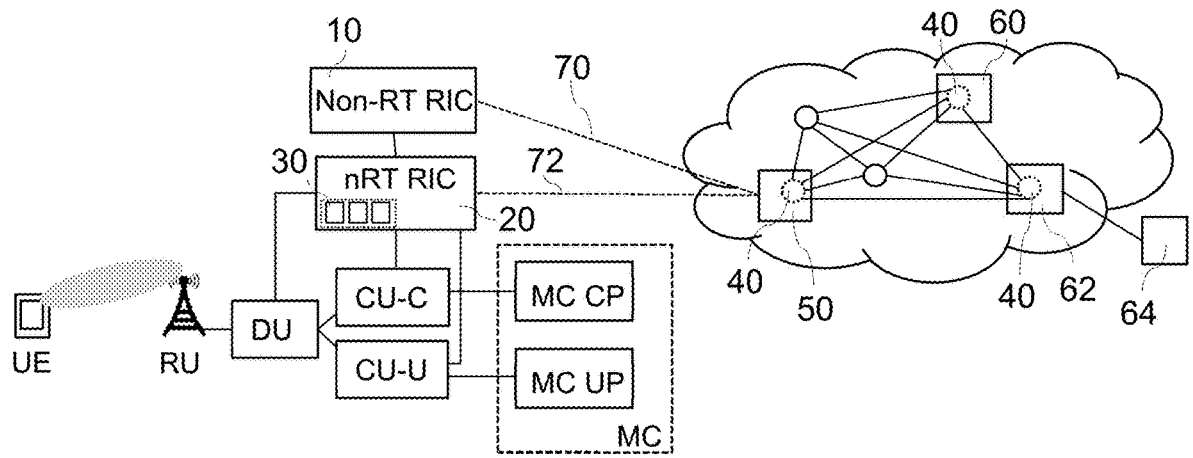
FIG. 3 illustrates an example system comprising a decentralized network for deploying RRM applications to RAN controllers.

FIG. 3 illustrates an example system, in which a distributed network of nodes 50, 60, 62 shares a distributed ledger 40. The distributed ledger 40 is replicated at the nodes, and may comprise the transactions(s) for RRM application deployment, comprising the application data and deployment method indication.

The node 50 is interface with radio access system, in the present example O-RAN based system. The node 50 may be configured to communicate indirectly with Non-RT RIC 10 located in SMO layer and/or communicate directly with nRT-RIC 20 via an associated dedicated interface 70, 72 connected to distributed network layer. A node 60 may be of an RRM application vendor registering its RRM application in the ledger, and/or an application vendor entity 64 may submit RRM application to be registered to the ledger by a node 62.

In some embodiments, as further illustrated below, the nodes 50, 60, 62 are blockchain nodes storing a blockchain ledger. Thus, a blockchain layer may be connected to key entities of the O-RAN interacting with xApps, such as nRT-RIC 20, CU-C, non-RT RIC 10, etc. For example, the node 50 may operate as a blockchain (replica) server, serving one or more RAN controllers.

The node 50 may be a dedicated entity for RAN interface and RRM application deployment. The node 50 may be part of CSP system or configured to communicate over secure interface 70, 72 with the RAN controller(s). The nodes can be located on any suitable premise including vendors, carriers, physical sites hosting O-RAN network nodes, public repositories etc. Further, a group of servers can be provided as a service. By applying presently disclosed features and the distributed ledger, xApps may be securely delivered within an O-RAN architecture guaranteeing that their origin point can be trusted, while providing high degree of flexibility for deployment in different environments. A permissioned blockchain technology may be applied, enabling encrypting and authenticating each communication channel.

Blockchain state information shared by the nodes may store all transactions and history carried out in the blockchain network. Application of blockchain technology and the ledger enable a way to track the unique history of transactions by the individual nodes in the network. Blockchains generally provide a completely auditable log that includes each transaction performed in the blockchain network.

Changes in resource ownership in a blockchain network take the form of blockchain transactions secured by strong cryptography. Information provided in a blockchain transaction may be stored (or registered) as a new block in the blockchain in response to validation of the respective blockchain transaction by consensus-based validation mechanism. A blockchain transaction may comprise an identifier of a new owner, that is the recipient, of the resource, together with a cryptographic signature of the previous owner, that is the sender, such that malicious attackers cannot re-assign resources they do not own.

Figure 4:
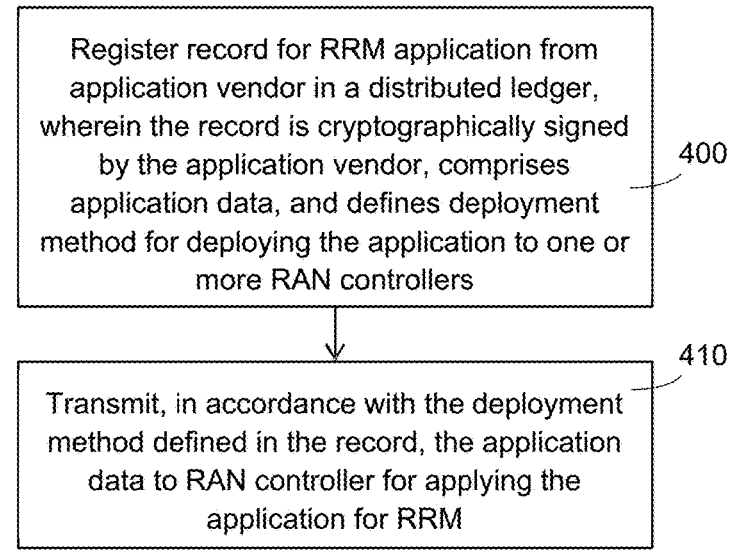
FIGS. 4 and 5 illustrate methods in accordance with at least some embodiments.

FIG. 4 is a flow graph of a first method in accordance with at least some embodiments. The illustrated first method may be performed by a network node capable of storing a distributed ledger, e.g. the node 50, such as a network device, apparatus or server, or a control device configured to control the functioning thereof, possibly when installed therein. It is to be noted that an action, such as transmitting, in a given block may refer to controlling or causing such action in another apparatus or unit.

The method comprises 400 registering a record for an RRM application from an application vendor in a distributed ledger. The record is cryptographically signed by the application vendor, comprises application data, and defines a deployment method for deploying the application to one or more RAN controllers. The record may comprise one or more transactions for storing this information, registered by or for an RRM application vendor and validated by validating nodes within the distributed network. A transaction may comprise the RRM application related data and a deployment method indicator. The deployment method may be specified as a flag in the transaction, for example. The record may be referred to as transaction record.

Block 400 may be entered in response to receiving a message to upload a new RRM application, or an update for an existing one, from an RRM application vendor. The message may comprise the transaction to be registered to the distributed ledger, or the transaction is generated based on the received message. In some embodiments, the record is registered by storing a blockchain transaction record in a permissioned blockchain upon validation of the blockchain transaction by validating nodes. Block 400 may comprise performing validation of the transaction before adding the transaction to the distributed ledger. If the apparatus performing the method is not involved in validation, block 400 may comprise just updating the distributed ledger with the transaction. Depending on the applied implementation, the record itself or data of the record is signed by the RRM vendor.

Block 410 comprises transmitting, in accordance with the deployment method defined in the record, the application data to a RAN controller for applying the application for RRM.

Figure 5:
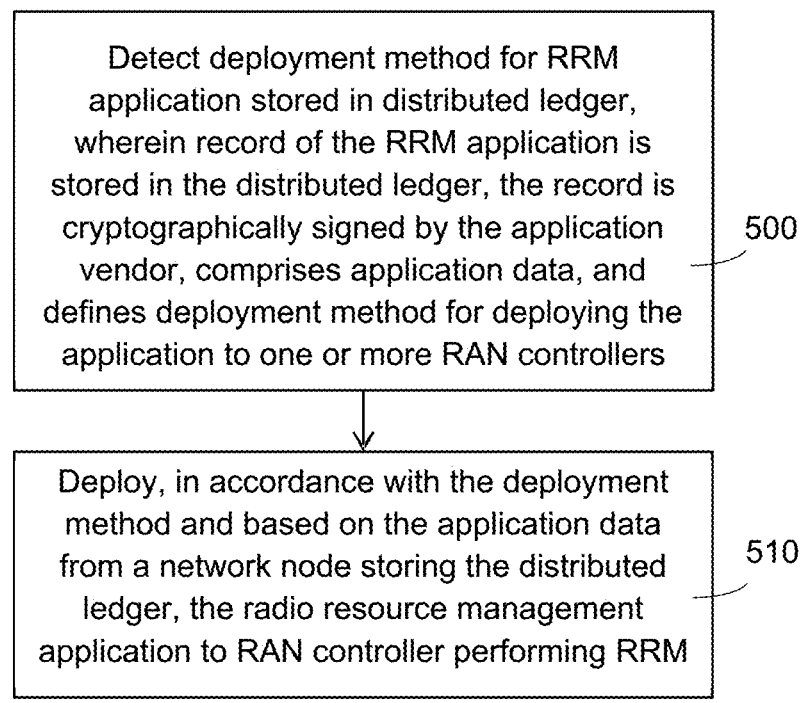

FIG. 5 is a flow graph of a second method in accordance with at least some embodiments. The illustrated method may be performed by RAN controller (entity), such as the Non-RT RIC 10 or the nRT RIC 20, or by a control device configured to control the functioning thereof. The RAN controller may be configured to communicate, at least as receiving entity, with an apparatus and network node performing the method of FIG. 4.

The method comprises detecting 500 a deployment method for an RRM application stored in a distributed ledger. A record of the RRM application is stored in the distributed ledger. The record is cryptographically signed by the application vendor, comprises application data, and defines the deployment method for deploying the application to one or more RAN controllers. Depending on the applied implementation option, the apparatus may detect the deployment method by directly accessing the record, or indirectly based on a received message indicative of the deployment method as defined in the record of the distributed ledger.

Block 510 comprises deploying, in accordance with the deployment method and based on the application data from a network node storing the distributed ledger, the RRM application to a RAN controller performing RRM.

It is to be noted that various further features may be applied for and in addition to blocks of FIGS. 4 and 5. In an example embodiment, before entering block 510, the cryptographic signature of the application vendor in the distributed ledger may be verified, and block 510 entered only upon successful verification. All data in the transaction may be signed by the RRM application vendor, to facilitate non-repudiable root of trust for entities receiving and using the RRM application data. For example, the signature can be used by the O-RAN infrastructure, such as the Non-RT RIC 10, to re-verify the source/authenticity of the xApp before it is installed.

There are a plurality of the implementation options and deployment methods for the methods of FIGS. 4 and 5, some of which are further illustrated below. These include direct or indirect deployment to the RAN controller applying the RRM. A pull or push deployment may be specified as the deployment method. Push deployment refers to pushing the application data in block 410 on the basis of the deployment setting. A further input from a further entity, other than the RAN controller to which the application data is transmitted may also be required to initiate the push deployment. In pull deployment, block 410 may be entered upon receiving a request for RRM application from the RAN controller.

The distributed ledger may further comprise identification information on RAN controller and/or other entities allowed to receive or access the application data. The transmission 410 may thus be performed for RAN controllers identified in the record. In case of pull deployment, block 410 may be entered in response to verifying that the requesting and controlling RAN controller is authorized to receive the application and/or in response to verifying that the applying RAN controller performing RRM is authorized to receive and apply the application.

The metadata may comprise information regarding the RRM application and deployment and/or application thereof. The metadata may comprise as at least one of version identifier, release date, identification information on targeted or authorized RAN controller(s). However, it will be appreciated that various further information related to the RRM application and/or usage thereof may additionally or instead be included in the metadata and the distributed ledger. For example, information for billing and/or auditing purposes may be included. Examples of such information may include one or more of error identifiers, number of controllers applying the xAPP, number of CU/DUs (E2 nodes) serviced by the RAN controller, and timestamps.

The RAN controller may refer generally to an entity configured to, directly or indirectly, control RAN, such as an O-RAN RIC 10, 20 controlling NR RRM. The RAN controller may be part of the RAN, or not part of but connected to one or more RAN entities, such as DU and CU of NR RAN. Deploying an RRM application may refer to transfer of the necessary data to its target network node without including the final applying i.e. commissioning of the RRM application to the system.

Depending on the applied embodiment, in some embodiments the RAN controller receiving the application data, stored in the distributed ledger and transmitted in block 410, may directly apply the received RRM application data. In case of O-RAN, the nRT RIC 20 may thus receive the RRM application data from the node 50 storing the distributed ledger 40.

Push Deployment

A direct network path between the distributed network node 50 storing the distributed ledger (and performing the method of FIG. 4) and the RAN controller receiving the RRM application data (there may be intermediate firewall(s)).

Figure 6A:
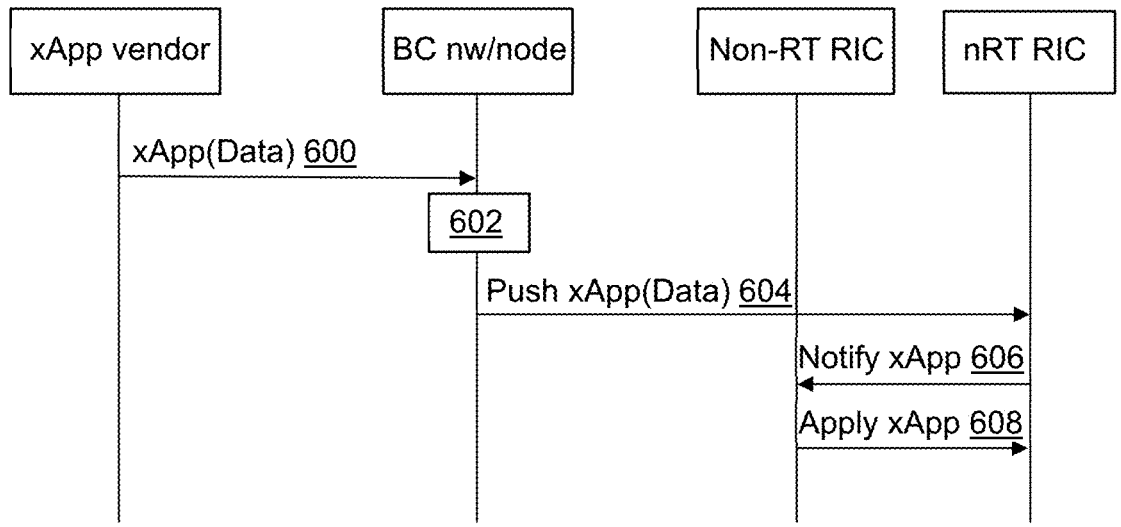
FIGS. 6a, 6b, 7a, and 7b are signalling diagrams in accordance with at least some embodiments.
Figure 6B:
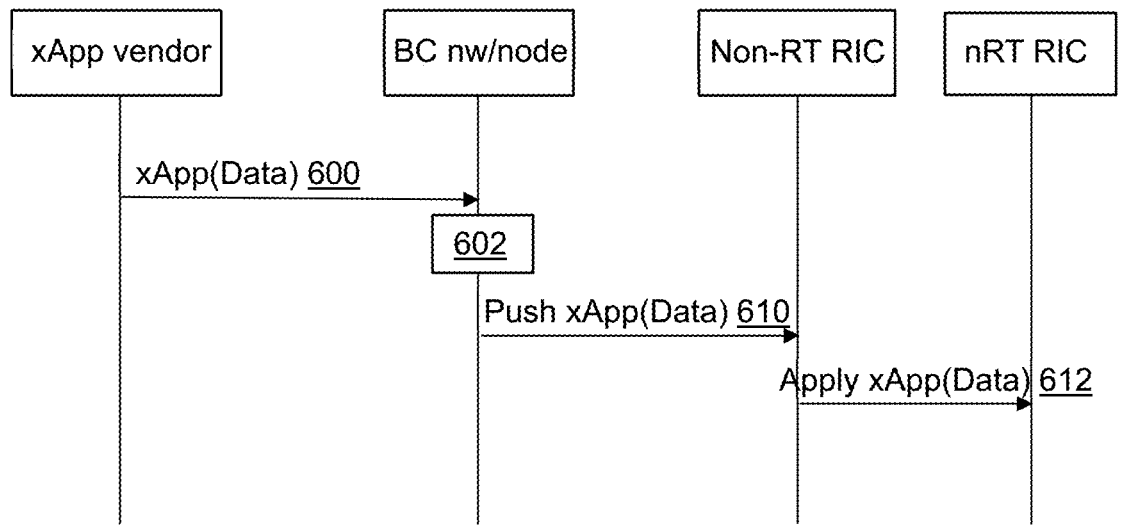

As illustrated in the push deployment examples of FIGS. 6a and 6b, after new xApp data transaction from an application vendor 60, or a node 62 acting on behalf of the vendor 64, is received 600 and associated blockchain transaction validated 602 by blockchain network/node, e.g. the node 50, associated transaction may be registered 602 in a blockchain ledger, e.g. the ledger 40.

In the example of FIG. 6a, push deployment is indicated in the transaction, and direct push mechanism is activated based on the deployment method indication in the transaction. The BC network/node may thus push 604 the xApp data directly to the nRT RIC, e.g. the nRT RIC 20. The delivered xApp may be applied only after new policies are dictated by the SMO plane. At this stage the xApp is safely deployed (but not installed/applied) within the O-RAN site. The SMO may then be informed by the nRT-RIC that the xApp is available and ready to be applied. This may be done by Notify xApp message 606 to the Non-RT RIC, e.g. the Non-RT RIC 10. The SMO, and the Non-RT RIC thereof, may then decide to trigger applying of the xApp, and send Apply xApp message 608 to the nRT RCI. In response to Apply xApp message, the xApp content can be installed and applied to related hardware. At this stage, the xApp is safely deployed and running in the O-RAN architecture.

In another embodiment, the RAN controller receiving the application data stored in the distributed ledger may deploy and transmit the application further to another RRM controlling entity, which applies the RRM application. As illustrated in the indirect push deployment example of FIG. 6b, the BC nw/node pushes 610 the XApp data to the Non-RT RIC, which may be considered as the controlling RAN controller, in charge of further deploying the xApp to the nRT RIC for applying it. The Non-RT RIC may thus send Apply xApp message 612 to the respective nRT-RIC, comprising the application data. This may be performed using a custom interface or the O1 interface. In general, presently disclosed new information between respective network entities or nodes, such as the entities or nodes 10, 20, and 50 of FIG. 3, may be communicated by a new customized interface or an existing interface complemented with new messages and/or information elements for these purposes. For example, new messages or fields may be defined for the xApp push, xApp data, xApp notification, xApp apply, and xApp pull, etc.

When indirect push deployment is activated by the transaction record in blockchain-based system, the blockchain network/node, e.g. node 50, may thus be in charge of communicating to all target SMOs the availability of a new or updated xApps. This may be performed instantly after the ledger replication process. In particular, the blockchain node(s) contact the target SMO(s) announcing the new xApps, and one server, the most accessible for a specific SMO, may be in charge of delivering the xApp data to the target SMO(s).

Pull Deployment

In case of pull deployment, the controlling RAN controller, e.g. the controlling Non-RT RIC or the applying nRT RIC may transmit a request to the network node 50 for the RRM application. The request may be transmitted before block 500 or 510. In response to the request and the pull deployment being defined for the RRM application, the application data may be transmitted to the controlling RAN controller, which may deploy 510 the RRM application further, or directly to the applying RAN controller.

The RAN controller may access the distributed ledger 40 to search for records for RRM applications applicable for the RAN controller performing radio resource management, i.e. the RAN controller itself, e.g. Non-RT RIC, or another RAN controller which applies the application, e.g. nRT RIC. Based on the search, the RAN controller may detect the record and the RRM application applicable for the RAN controller. The RAN controller may then transmit the request for the identified RRM application.

Figure 7A:
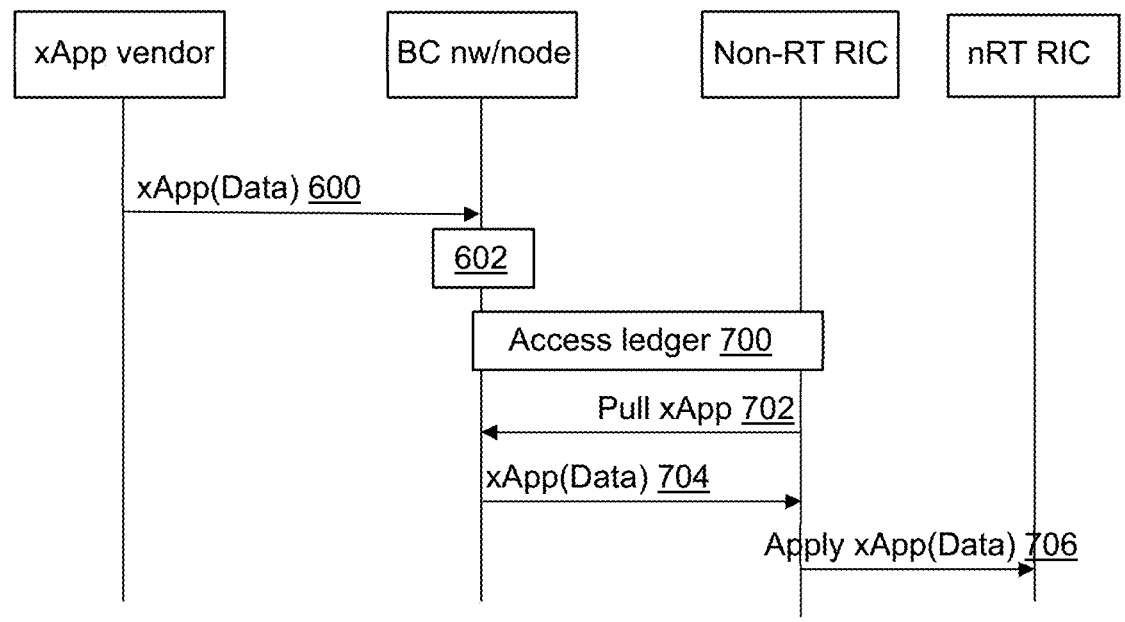
Figure 7B:
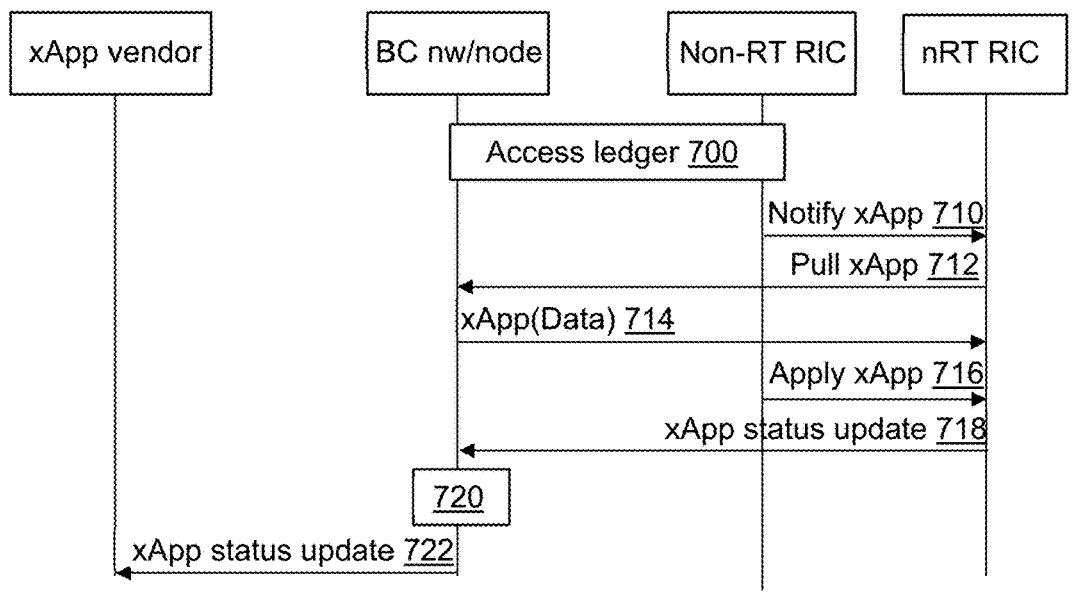

FIGS. 7a and 7b illustrate some example in which the Non-RT RIC accesses 700 the blockchain ledger stored in the blockchain network/node and searches the records of the blockchain ledger. For example, it repetitively polls the distributed ledger for new published or updated xApps available and suitable for it or RAN controller(s) it represents or controls. A relevant xApp is found and the Non-RT RIC initiates deployment in accordance with deployment method defined for the xApp in the associated blockchain transaction record.

In the example of FIG. 7a, direct pull deployment is defined, and the Non-RT RIC transmits a pull request 702 for the identified xApp. The request may include an identifier of the xApp and/or the record. In response to the request 702, the BC node checks the deployment method set in the respective record. In this example, pull deployment is set, and the BC node sends 704 the xApp data to the Non-RT RIC. The Non-RT RIC may then decide to trigger applying of the xApp, and send Apply xApp message 706, comprising the application data, to the nRT RCI (similarly as in 612).

In the example of FIG. 7b indirect pull deployment is defined, and the Non-RT RIC, after identifying the xApp based on the distributed ledger, notifies the nRT-RIC of the xApp by Notify xApp message 710. This may be an instruction for the nRT-RIC to obtain the xApp. The nRT RIC transmits a pull request 712 for the identified xApp. In response to the request 712, the BC nw/node checks the deployment method set in the respective record. In this example, pull deployment is set, and the BC nw/node sends 714 the xApp data to the nRT RIC. The nRT RIC may notify the Non-RT RIC of the received xApp (not shown). The Non-RT RIC may then decide to trigger applying of the xApp, and send Apply xApp message 716 to the nRT RIC.

After the deployment, the applying of the RRM application may include commissioning of the application. The RAN controller performing RRM may install the application according to applied software patch commissioning or installation scheme, which may include checking integrity of the application, for example.

The RAN controller may be configured to transmit a response message to update the distributed ledger to indicate application of the RRM application. The RAN controller may be configured to transmit the response message directly for storage to the distributed ledger, as a request to update the distributed ledger or a new transaction to be validated. As illustrated in FIG. 7b, the nRT RIC may transmit an xApp update message or transaction 718 after successfully applying the xApp.

In an alternative embodiment, the applying RAN controller (nRT RIC) transmits status update message, indicative of the applying of the application, to the controlling RAN controller (Non-RT RIC), which may transmit the RRM application (xApp) update message or transaction to update the ledger. Associated transaction indicative of the applying of the application may be broadcast for at least some of the nodes of the blockchain network for validation and inclusion in the distributed ledger upon successful validation.

After addition 720 of the associated transaction in the distributed ledger, a message 722 may be transmitted to the xApp vendor to update the application status. For example, such message may be controlled by a smart contract, or the xApp vendor may proactively search for updated status regarding its xApp. Hence, the xApp vendor may confirm a successful delivery and application of the xApp via the distributed ledger. Assuming the honesty of the O-RAN response, the vendor can trustly evaluate the response obtained from the blockchain.

The xApp vendor may have an active service that automatically (or on demand) checks the blockchain for updates. Thus, it can retrieve automatically the message 722 after the associated transaction has been added 720 in the distributed ledger. In another example embodiment, the xApp vendor has a listening service which is in charge of receiving notifications from the ledger. Thus, it will receive the message 722. In both cases, the message 722 may be sent by a subset of designated replicas in the blockchain but always signed by all the replicas of the blockchain. It is to be noted that the features disclosed in connection with 718 to 722 may be applied, potentially with some variations, with other embodiments, such as those of FIGS. 6a to 7a. For example, in FIG. 7a, the nRT RCI may after xApp applying send a status update to Non-RT RIC, which responsive to this transmits xApp status update similar to message 718 for updating the distributed ledger.

The RRM application may be stored in the distributed ledger (in the application data of the transaction record) as encrypted source code. This retains secrecy of the implementation of the RRM application, but can still be compiled at the destination network node. For example, a standard multi-key encryption scheme may be used to allow the decryption only by the target nRT-RICs (or in general O-RAN sites) that should receive the RRM application. In some embodiments, the RRM application is stored in the distributed ledger as plaintext source code. This allows to easily audit the RRM applications for security reasons by any node 50, 60, 62 of the distributed network, e.g. by integrity verification. The distributed ledger and the transaction record may comprise compiling metadata. These options allow to recompile the RRM application on a specific platform to gain maximum performance for that specific environment.

In another embodiment, the RRM application is stored in the distributed ledger as compiled code. Thus, secrecy of the implementation is retained and no compiler is required on the target RAN platform.

The RRM application may be an ML-based xApp, and configured to perform ML-based RRM for at least one of: radio transmission scheduling, radio link adaptation, RAN mobility decisions, beam management, radio access network admission control, radio access network congestion control, carrier aggregation, and dual connectivity configuration and activation management.

An example of one of the more demanding usage areas is ultrareliable and low latency communications URLLC/time-sensitive communication TSC, where latencies of 0.5-1.0 ms need to be guaranteed with outage probabilities of 1e-6 to 1e-5, and hence there is hardly any room for making errors. For TSC use cases, the deterministic behaviour of the traffic can be utilized in the design of smart ML-driven XApps.

Another group of challenging emerging applications is the family of eXtended Reality (XR) use cases, which include e.g. Cloud Gaming, Augmented reality, and Virtual reality. As a few non-limiting examples, gaming or interactive data exchanging use cases may require 10 ms latency, as high as 1 Gbps, and 99.99% reliability, while consume virtual reality (VR) content via tethered VR headset use case requires 5 ms, 10 Gbps, 99.99%.

As a further example, the system of FIG. 1 may apply a set of beams to provide cell coverage. For example, if the system is a 5G mmwave system, a grid of beams is applied and it is known at each instance in time which beam is serving a given user. The UE may be configured to report channel measurements, such as measurements on a number of beams, via channel state information (CSI). Based on the reported channel measurements, the gNB can perform cell selection and/or beam management procedure. For example, the gNB may determine which is the best beam that should serve the UE, and perform a beam management procedure signaling the UE to receive from the best beam. In an example ML-based solution, the gNB may use an ML model and store history data of which beam best serves the UE as the UE continues on its trajectory. For example, when moving UE's signal to the serving RU is suddenly blocked or weakened and a handover request is generated, the ML model can be trained to predict when these blockage events happen. The model may be trained to predict to which new cell ID the UE needs to be handed over to, e.g. based on past time series of beam indices. Training generally implies learning of optimized parameters of the ML model, such as weights of neural networks, based on training data available, with the aim to create a model that generalizes well to unknown data set. After the ML model has been sufficiently trained, it may be deployed to make predictions e.g. on need for handover. Such deployment stage may also be referred to as online inference stage or phase. If the ML model predicts with high probability that a blockage event is going to occur and a handover to a new RU will take place, the system can proactively issue a handover command to the UE prior to the actual blockage event happening. This enables to achieve better performance as the sudden loss in signal quality can be avoided and a high quality of service (e.g. high data rate and/or low packet loss rate) can be maintained for the UE.

However, it will be appreciated that the above represent only just some examples and at least some of the above illustrated features may be applied for RRM application deployment for various other types of RANs or application scenarios. Hence, embodiments illustrated above in connection with O-RAN entities, e.g. in connection with FIGS. 6a to 7b, may be applied in network nodes and RAN controllers of other systems.

An electronic device comprising electronic circuitries may be an apparatus for realizing at least some embodiments of the present invention. The apparatus may be (or may be comprised in) a computer, a machine to machine (M2M) device, a radio access network control device, a network function element or node, a server, a network device configured to operate as a node for distributed network (e.g. blockchain), for example. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

Figure 8:
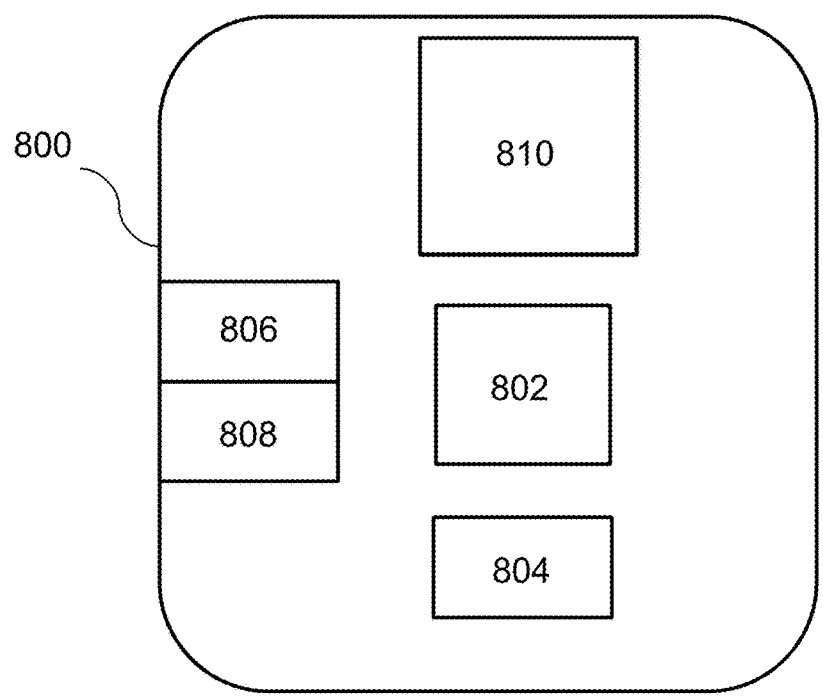
FIG. 8 illustrates an example apparatus capable of supporting at least some embodiments.

FIG. 8 illustrates an example apparatus capable of supporting at least some embodiments of the present invention. Illustrated is a device 800, which may comprise a communications device arranged to operate as the network node 50 or the RAN controller, for example. The device may include one or more controllers configured to carry out operations in accordance with at least some of the embodiments illustrated above, such as some of the features illustrated above in connection with FIGS. 3 to 7b. The device may be configured to operate as the apparatus configured to perform the method of FIG. 4 or 5, for example.

Comprised in the device 800 is a processor 802, which may comprise, for example, a single- or multi-core processor wherein a single-core processor comprises one processing core and a multi-core processor comprises more than one processing core. The processor 802 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 800 may comprise memory 804. The memory may comprise random-access memory and/or permanent memory. The memory may comprise at least one RAM chip. The memory may comprise solid-state, magnetic, optical and/or holographic memory, for example. The memory may be at least in part accessible to the processor 802. The memory may be at least in part comprised in the processor 802. The memory 804 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 800 but accessible to the device.

For example, computer program code and control parameters for controlling above-illustrated actions for or enabling deployment of RRM application may be stored in one or more portions of the memory and used to control operation of the apparatus. Further, the memory may be used as a temporary data storage.

The device 800 may comprise a transmitter 806. The device may comprise a receiver 808. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example.

The device 800 may comprise user interface, UI, 810. The UI may comprise at least one of a display, a keyboard, a touchscreen, a speaker and a microphone. A user may be able to operate device 800 via UI 810, for example to configure the operation and parameters of the device.

The processor 802 may be furnished with a transmitter arranged to output information from the processor, via electrical leads internal to the device 800, to other devices comprised in the device. Such a transmitter may comprise a serial bus transmitter arranged to, for example, output information via at least one electrical lead to memory 804 for storage therein. Alternatively to a serial bus, the transmitter may comprise a parallel bus transmitter. Likewise the processor may comprise a receiver arranged to receive information in the processor, via electrical leads internal to the device 800, from other devices comprised in the device 800. Such a receiver may comprise a serial bus receiver arranged to, for example, receive information via at least one electrical lead from the receiver 808 for processing in the processor. Alternatively to a serial bus, the receiver may comprise a parallel bus receiver. The device 800 may comprise further devices not illustrated in FIG. 8, such as further transmitter(s) and receiver(s) or a memory module (e.g. for user identification).

The processor 802, the memory 804, the transmitter 806, the receiver 808, and/or the UI 810 may be interconnected by electrical leads internal to the device 800 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an example embodiment, an apparatus, such as, for example, a network node, a network device, or a controller thereof, may comprise means for carrying out the embodiments described above and any combination thereof.

In an example embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an example embodiment, an apparatus, such as, for example, a network node a network device, or a controller thereof, may comprise at least one processor, and at least one memory including computer program code, wherein the at least one memory and the computer program code are configured to, with the at least one processor, cause the apparatus at least to perform the embodiments described above and any combination thereof. For example, the at least one memory and the computer program code are configured to, with the at least one processor, cause the apparatus at least to perform the method of FIG. 4 or FIG. 5, or an above-disclosed further embodiment thereof.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising:
at least one processing core,
at least one memory including computer program code,
the at least one memory and the computer program code being configured to, with the at least one processing core, cause the apparatus at least to:
register a record for a radio resource management application from an application vendor in a distributed ledger, wherein the record is cryptographically signed by the application vendor, comprises application data, and defines a deployment method for deploying the application to one or more radio access network controllers; and
transmit, in accordance with the deployment method defined in the record, the application data to a radio access network controller for applying the application for radio resource management.

2. The apparatus of claim 1, is further configured to:
detect push deployment being defined as the deployment method for the radio resource management application; and
push the application to the radio access network controller in response to the push deployment being activated based on the record.

3. The apparatus of claim 2, is further configured to:
review records of the distributed ledger and detect a new or updated radio resource management application with push deployment added into the distributed ledger;
identify one or more radio access network entities for which the new or updated radio resource management application with push deployment is applicable; and
push the new or updated radio resource management application to the identified one or more radio access network entities.

4. The apparatus of claim 1, is further configured to:
detect pull deployment being defined as the deployment method for the radio resource management application;
receive a request from the radio access network controller for the radio resource management application; and
transmit the application data to the radio access network controller in response to the request and the pull deployment being defined for the radio resource management application.

5. The apparatus of claim 1, wherein the radio access network controller is a non-realtime radio access network intelligent controller configured to control a near-realtime radio access network intelligent controller to host the radio resource management application, or
the radio access network controller is a near-realtime radio access network intelligent controller configured to host the radio resource management application.

6. An apparatus comprising:
at least one processing core,
at least one memory including computer program code,
the at least one memory and the computer program code being configured to, with the at least one processing core, cause the apparatus at least to:
detect a deployment method for a radio resource management application stored in a distributed ledger, wherein a record of the radio resource management application is stored in the distributed ledger, the record is cryptographically signed by an application vendor, comprises application data, and defines the deployment method for deploying the application to one or more radio access network controllers; and
deploy, in accordance with the deployment method and based on the application data from a network node storing the distributed ledger, the radio resource management application to a radio access network controller performing radio resource management.

7. The apparatus of claim 6, is further configured to:
access the distributed ledger to search for records for radio resource management applications applicable for the radio access network controller performing radio resource management; and
in response to detecting the radio resource management application applicable for the radio access network controller,
retrieve or request the application data in the record of the distributed ledger and transmit the application data to the radio resource controller performing radio resource management; or
notify the radio access network controller performing radio resource management of the radio resource management application.

8. The apparatus of claim 7, wherein the radio access network controller is a non-realtime radio access network intelligent controller configured to control a near-realtime radio access network intelligent controller to host the radio resource management application.

9. The apparatus of claim 6, is further configured to:
receive a notification or a request from a controlling radio access network controller to obtain the radio resource management application; and retrieve or request the application data in the record of the distributed ledger in response to the received request.

10. The apparatus of claim 9, wherein the apparatus is or comprises the radio access network controller, comprising a near-realtime radio access network intelligent controller configured to host the radio resource management application, and the controlling radio access network controller is non-realtime radio access network intelligent controller, and the radio resource management application is configured to perform machine-learning based radio resource management for at least one of: radio transmission scheduling, radio link adaptation, radio access network mobility decisions, beam management, radio access network admission control, radio access network congestion control, carrier aggregation, and dual connectivity configuration and activation management.

11. The apparatus of claim 6, is further configured to transmit, after applying the radio resource management application, a response message to update the distributed ledger to indicate application of the radio resource management application by the radio access network controller.

12. A method for a network node, comprising:
registering a record for a radio resource management application from an application vendor in a distributed ledger, wherein the record is cryptographically signed by the application vendor, comprises application data, and defines a deployment method for deploying the application to one or more radio access network controllers; and
transmitting, in accordance with the deployment method defined in the record, the application data to a radio access network controller for applying the application for radio resource management.

13. The method of claim 12, further comprising:
detecting push deployment being defined as the deployment method for the radio resource management application; and
pushing the application to the radio access network controller in response to the push deployment being activated based on the record.

14. The method of claim 13, further comprising:
reviewing records of the distributed ledger; and
detecting a new or updated radio resource management application with push deployment added into the distributed ledger;
identifying one or more radio access network entities for which the new or updated radio resource management application with push deployment is applicable; and
pushing the new or updated radio resource management application to the identified one or more radio access network entities.

15. The method of claim 12, further comprising:
detecting pull deployment being defined as the deployment method for the radio resource management application;
receiving a request from the radio access network controller for the radio resource management application; and
transmitting the application data to the radio access network controller in response to the request and the pull deployment being defined for the radio resource management application.

16. The method of claim 12, wherein the radio access network controller is a non-realtime radio access network intelligent controller configured to control a near-realtime radio access network intelligent controller to host the radio resource management application; or
the radio access network controller is a near-realtime radio access network intelligent controller configured to host the radio resource management application.

* * * * *